United States Patent
Haynes et al.

(10) Patent No.: US 12,186,827 B2
(45) Date of Patent: *Jan. 7, 2025

(54) SYSTEMS AND METHODS FOR HIGH STRENGTH TITANIUM ROD ADDITIVE MANUFACTURING

(71) Applicant: GOODRICH CORPORATION, Charlotte, NC (US)

(72) Inventors: Noel C. Haynes, Etobicoke (CA); Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/528,999

(22) Filed: Nov. 17, 2021

(65) Prior Publication Data

US 2023/0150052 A1 May 18, 2023

(51) Int. Cl.
*B23K 20/12* (2006.01)
*B22F 3/12* (2006.01)
(Continued)

(52) U.S. Cl.
CPC .............. *B23K 20/122* (2013.01); *B22F 3/12* (2013.01); *B22F 10/28* (2021.01); *B22F 12/226* (2021.01);
(Continued)

(58) Field of Classification Search
CPC ........ B23K 20/122–1295; B23K 3/063; B23K 35/0227; B23K 35/40; B23K 35/0261; B23K 35/325; B22F 3/12; B22F 10/28; B22F 12/226; B22F 2201/20; B22F 2301/052; B22F 2301/205; B22F 2301/35; B22F 3/18; B22F 3/14; B22F 3/02; B22F 2998/10; B22F 5/12; B22F 10/20; B22F 10/64; B33Y 10/00; B33Y 80/00;
(Continued)

(56) References Cited

U.S. PATENT DOCUMENTS

| 8,893,954 | B2 | 11/2014 | Schultz et al. | |
| 10,987,754 | B1 * | 4/2021 | Eller | B23K 20/1255 |

(Continued)

FOREIGN PATENT DOCUMENTS

| CA | 3178479 A1 * | 5/2023 | ............. B22F 10/20 |
| CN | 103938005 A * | 7/2014 | |

(Continued)

OTHER PUBLICATIONS

USPTO; Notice of Allowance dated Jul. 26, 2023 in U.S. Appl. No. 17/525,722.

(Continued)

*Primary Examiner* — Kiley S Stoner
(74) *Attorney, Agent, or Firm* — SNELL & WILMER L.L.P.

(57) ABSTRACT

A method of forming a rod feedstock for titanium stir friction welding additive manufacturing may comprise: mixing a plurality of powdered metals comprising titanium, iron, vanadium, and aluminum to produce a powder blend; at least one of die pressing the powder blend to form a die pressed powder or continuously powder rolling the powder blend to form a die pressed powder; and sintering the powder blend to form a rod feedstock having a cross-sectional profile.

12 Claims, 5 Drawing Sheets

(51) Int. Cl.
  *B22F 10/28* (2021.01)
  *B22F 12/00* (2021.01)
  *B23K 3/06* (2006.01)
  *B23K 35/02* (2006.01)
  *B33Y 10/00* (2015.01)

(52) U.S. Cl.
  CPC .......... *B23K 3/063* (2013.01); *B23K 35/0227* (2013.01); *B33Y 10/00* (2014.12); *B22F 2201/20* (2013.01); *B22F 2301/052* (2013.01); *B22F 2301/205* (2013.01); *B22F 2301/35* (2013.01)

(58) Field of Classification Search
  CPC .......... B33Y 40/20; B33Y 70/00; Y02P 10/25; C22C 1/0458; C22C 14/00; C22F 1/183
  USPC .............................. 228/112.1–114.5, 2.1–2.3
  See application file for complete search history.

(56) References Cited

U.S. PATENT DOCUMENTS

| | | | | |
|---|---|---|---|---|
| 2003/0042292 | A1* | 3/2003 | Hatten | B23K 20/128 228/2.1 |
| 2004/0146736 | A1* | 7/2004 | Ivanov | C22C 1/047 428/609 |
| 2009/0041609 | A1* | 2/2009 | Duz | C22C 32/0047 419/17 |
| 2009/0252638 | A1* | 10/2009 | Duz | C22C 1/0458 419/37 |
| 2011/0266330 | A1* | 11/2011 | Bruck | B23K 20/128 228/112.1 |
| 2012/0009339 | A1* | 1/2012 | Creehan | B23K 20/1245 427/180 |
| 2016/0243617 | A1* | 8/2016 | Ivasishin | B22F 3/1125 |
| 2018/0245186 | A1 | 8/2018 | Welk et al. | |
| 2019/0308283 | A1 | 10/2019 | Parrish et al. | |
| 2020/0047248 | A1 | 2/2020 | Panza-Giosa et al. | |
| 2020/0238379 | A1 | 7/2020 | Hayes et al. | |
| 2020/0306869 | A1* | 10/2020 | Hardwick | B23K 20/227 |
| 2021/0053283 | A1 | 2/2021 | Liu et al. | |
| 2021/0069832 | A1 | 3/2021 | Burbaum et al. | |
| 2021/0086437 | A1* | 3/2021 | Fairgrieve | B29C 64/118 |
| 2021/0102276 | A1* | 4/2021 | Martin | C22C 1/0416 |
| 2021/0146439 | A1* | 5/2021 | Hundley | B22F 10/28 |
| 2021/0154740 | A1 | 5/2021 | Senderos et al. | |
| 2022/0176633 | A1* | 6/2022 | Hardwick | B29C 64/379 |
| 2023/0039985 | A1* | 2/2023 | Mironets | B22F 12/70 |
| 2023/0150027 | A1* | 5/2023 | Haynes | B33Y 40/20 419/42 |

FOREIGN PATENT DOCUMENTS

| | | | | |
|---|---|---|---|---|
| CN | 103966500 | A | * | 8/2014 |
| CN | 104550963 | A | * | 4/2015 |
| CN | 110461535 | A | * | 11/2019 ................ B22F 1/02 |
| CN | 112775584 | A | * | 5/2021 ............. B22F 1/0003 |
| CN | 112959012 | A | * | 6/2021 ............. B22F 3/1125 |
| CN | 113953516 | A | * | 1/2022 |
| CN | 114717440 | A | * | 7/2022 |
| EP | 3610972 | | | 2/2020 |
| EP | 3685957 | | | 7/2020 |
| EP | 4180139 | A1 | * | 5/2023 ............. B22F 10/20 |
| JP | H07258835 | A | * | 10/1995 |
| KR | 20210049085 | A | * | 5/2021 |
| KR | 20210130704 | A | * | 11/2021 |

OTHER PUBLICATIONS

European Patent Office, European Search Report dated Mar. 13, 2023 in Application No. 22205929.7.

European Patent Office, European Search Report dated Mar. 15, 2023 in Application No. 22207498.1.

Georg I. Abakumov et al, "Powder Metallurgy Titanium and Titanium Alloy Components Manufactured from Hydrogenated Titanium Powders", Georg Abakumov, Director Business Development, ADMA Products, Inc., Oct. 10, 2019 (Oct. 10, 2019), XP055648460, Retrieved from the Internet: URL: https://cdn.ymaws.com/titanium.org/resource/resmgr/2010_2014_papers/AbakumovGeorg_2012.pdf, [retrieved on Dec. 3, 2019], pp. 1-38.

USPTO; Ex Parte Quayle Office Action dated Apr. 19, 2023 in U.S. Appl. No. 17/525,722.

USPTO; Requirement for Restriction dated Nov. 3, 2022 in U.S. Appl. No. 17/525,722.

USPTO; Ex Parte Quayle Office Action dated Apr. 11, 2024 in U.S. Appl. No. 18/463,786.

* cited by examiner

SYSTEMS AND METHODS FOR HIGH STRENGTH TITANIUM ROD ADDITIVE MANUFACTURING

FIELD

The disclosure generally relates to the manufacture of feedstock for producing aerospace components via additive manufacturing processes and more particularly to methods of manufacture for rod feedstock being produced from titanium and other metallic powders.

BACKGROUND

Aircraft landing gear designs incorporate large structural components made from high strength titanium alloys. Powder based additive manufacturing techniques, such as powder bed, for titanium alloy landing gear components are unsuited for producing large parts. Rod deposition additive manufacturing techniques may be used to form large parts. However, existing rod feedstocks for titanium alloys are high cost and tend to have reduced tensile and/or fatigue strength in comparison to wrought processed material.

SUMMARY

A method of titanium rod additive manufacturing is disclosed herein. The method may comprise: mixing a plurality of powdered metals comprising titanium, iron, vanadium, and aluminum to produce a powder blend; die pressing the powder blend to form a die pressed powder blend; sintering the die pressed powder blend to form a rod feedstock having a cross-sectional profile; loading the rod feedstock into an additive manufacturing machine configured to deposit the rod feedstock; and producing a metallic component from the rod feedstock.

In various embodiments, the titanium is a titanium hydride powder. The powder blend may comprise between 4% and 6% by weight iron, between 0.5% to 2% by weight aluminum, and between 6% to 9% by weight vanadium. The sintering may be performed between 900° F. (482° C.) and 1600° F. (871° C.) and under a vacuum. The isostatic pressing may be performed within a temperature range between 1652° F. (900° C.) and 2,282° F. (1,250° C.). The additive manufacturing machine may comprise a rotating tool having an aperture disposed therethrough. The rod feedstock may be fed through the aperture of the rotating tool. A first density of the rod feedstock may be less than 100% of a second density for a known specification of a wrought metal alloy associated with a material composition of the powder blend. The cross-sectional profile of the rod feedstock may be a substantially square shape. Each side length of the rod feedstock may be between 0.05 inches (0.127 cm) and 0.5 inches (1.27 cm). Loading the rod feedstock may further comprise applying an axial force to the rod feedstock to translate the rod feedstock through an aperture of a rotating tool.

A method of titanium rod additive manufacturing is disclosed herein. The method may comprise: mixing a plurality of powdered metals comprising titanium, iron, vanadium, and aluminum to produce a powder blend; continuously powder rolling the powder blend to form a powder rolled blend; sintering the powder rolled blend to form a rod feedstock having a first cross-sectional profile; loading the rod feedstock into an additive manufacturing machine configured to deposit the rod feedstock; and producing a metallic component from the rod feedstock. The powdered metals may comprise between 4% and 6% by weight iron, between 0.5% to 2% by weight aluminum, and between 6% to 9% by weight vanadium. The metallic component may comprise between 0.1% and 1.0% by weight oxygen and between 0.001% and 0.015% by weight hydrogen. A first density of the rod feedstock may be less than 100% of a second density for a known specification of a wrought metal alloy associated with a material composition of the powder blend. The cross-sectional profile of the rod feedstock may be a substantially square shape, and wherein each side length of the rod feedstock is between 0.05 inches (0.127 cm) and 0.5 inches (1.27 cm).

A method of forming a rod feedstock for titanium stir friction welding additive manufacturing is disclosed herein. The method may comprise: mixing a plurality of powdered metals comprising titanium, iron, vanadium, and aluminum to produce a powder blend; at least one of die pressing the powder blend to form a die pressed powder or continuously powder rolling the powder blend to form a die pressed powder; and sintering the powder blend to form a rod feedstock having a cross-sectional profile.

In various embodiments, the titanium is a titanium hydride powder. The powder blend may comprise between 4% and 6% by weight iron, between 0.5% to 2% by weight aluminum, and between 6% to 9% by weight vanadium. The cross-sectional profile of the rod feedstock may be a substantially square shape, and each side length of the rod feedstock may be between 0.05 inches (0.127 cm) and 0.5 inches (1.27 cm).

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Titanium alloy Ti-185 has a relatively high tensile strength; however, the high iron percentage of the alloy causes segregation during conventional melting. Powder metallurgy techniques such as, for example, pressing and sintering may overcome the segregation issues induced in conventional melt metallurgy thereby enabling a lower cost part. Alloying powder may be either elemental powders (e.g., Ti, Fe, V, Al), master alloy powders, or a combination thereof. Sintered billets may be drawn or otherwise worked into a rod feedstock for additive manufacturing operations. In this regard, large high strength titanium alloy components such as, for example, pistons, bogie beams, torque links, brake rods, and/or the like may be produced at reduced cost. Additionally, additive manufacturing according to the process described herein may tend to overcome macro segregation issues encountered in conventional melt metallurgy and benefit of enhanced fatigue and ultimate strength.

In various embodiments, methods and/or processes disclosed herein may eliminate thermomechanical processing prior to a stir friction weld process. In this regard, feedstock for a stir friction weld process may be manufactured in an inexpensive and efficient manner and maintain structural capabilities of the feedstock, in accordance with various embodiments.

Figure 1:
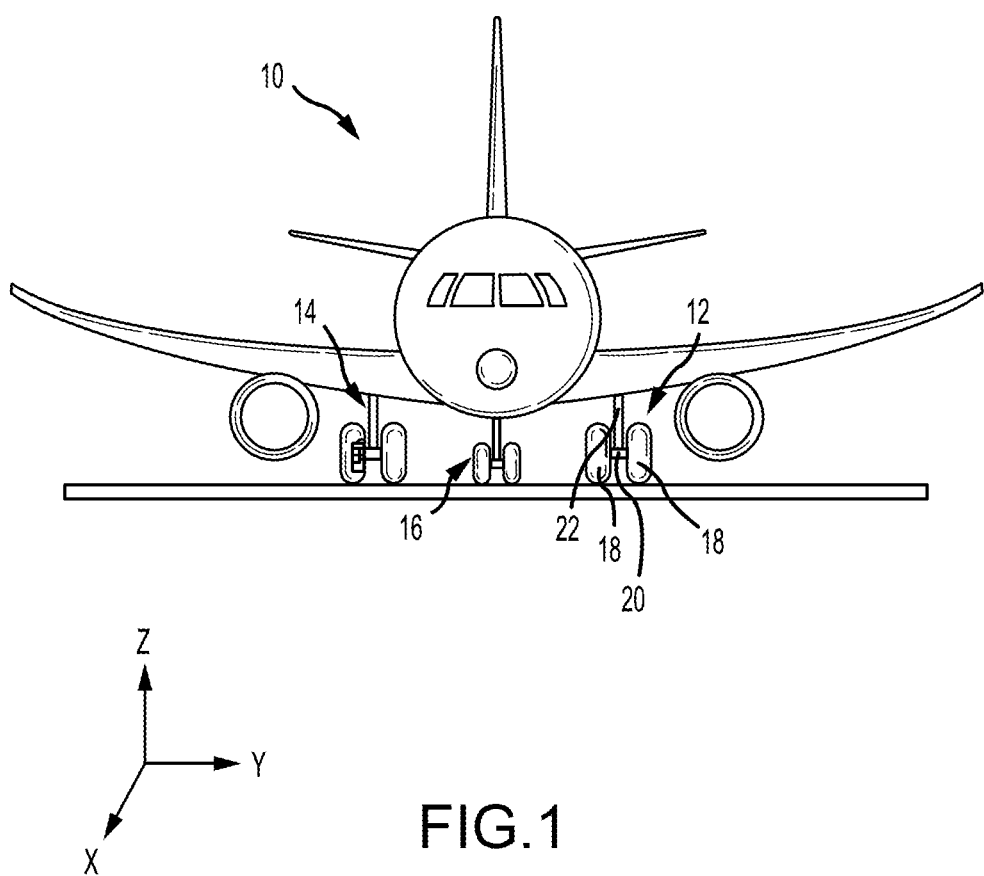
FIG. 1 illustrates an exemplary aircraft, in accordance with various embodiments.

With reference to FIG. 1, an aircraft 10 in accordance with various embodiments may comprise aircraft systems and components. For example, aircraft 10 may comprise one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut 22. In operation, aircraft landing gear may experience significant forces such as landing loads and aerodynamic loads and may tend to benefit from high performance alloy construction. In various embodiments, aircraft 10 components such as landing gear 12 and shock strut 22 may comprise complex geometries tending to benefit from additive manufacturing techniques.

Figure 2A:
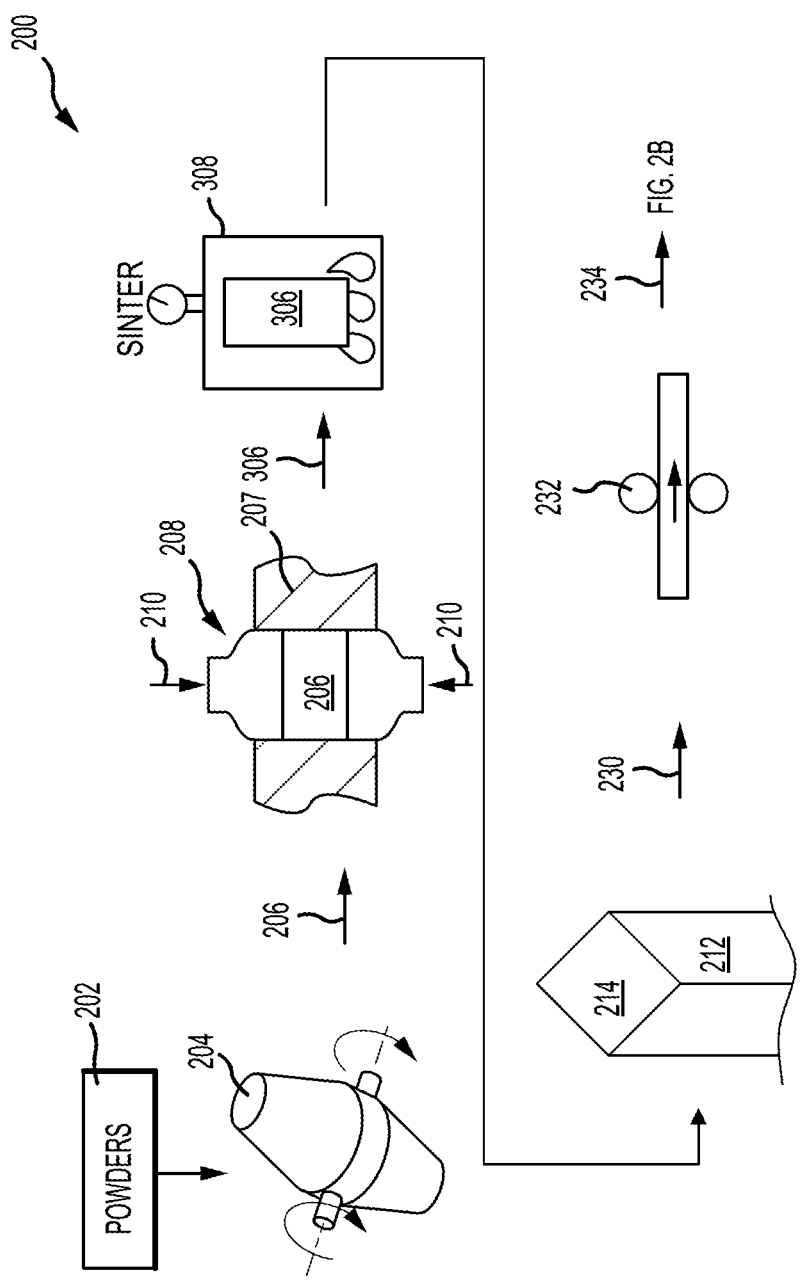
FIG. 2A illustrates a method for titanium rod additive manufacturing, in accordance with various embodiments.

With additional reference to FIG. 2A, a method for titanium rod additive manufacturing is illustrated according to various embodiments. A plurality of powdered metals 202 comprising titanium and iron are added to powder blender 204 and blended to consistency to powder blend 206. In various embodiments, powder blend 206 may comprise titanium and iron and any of oxygen, aluminum, vanadium, and/or hydrogen. Powdered metals 202 may include titanium hydride powder. Powder blend 206 may be between 4% and 6% by weight iron, between 0.5% to 2% by weight aluminum, and between 6% to 9% by weight vanadium. The input powders may contain oxygen ($O_2$) and hydrogen ($H_2$) levels between 0.01 and 1.0% by weight. In various embodiments, powdered metals consist of Al-V master alloy and Fe elemental powder blended with $TiH_2$ powder. The billet elemental weight percent may be adjusted to account for vaporization of elements such as aluminum during the rod-fed additive process tending thereby to ensure the additive manufactured part is within a desired weight percent limit. In various embodiments, the billet shape may be a solid round or other shape as appropriate to input stock for rod drawing.

Powder blend 206 is loaded into a die press 208 for metallic powders, which is subjected to a uni-axial pressure 210 between in a die 207 between two rigid punches to compact the powder blend 206 to achieve a uniform, or near uniform, density. "Near uniform" as described herein refers to a variation in local density less than 10% of an average density, or less than 5% of an average density. The die 207 may be filled with the powder blend 206 and the upper punch may translate down with a predetermined pressure (e.g., between 10,000 psi [69 MPa] and 120,000 psi [830 MPa]) for a predetermined number of cycles (e.g., between 400 to 5,000 times/hour). In various embodiments, temperatures for die pressing may be between ambient (approximately 70° F. [21° C.]) and 200° F. [93° C.]. In various embodiments, hot die pressing of the powder blend 206 may be performed in the die 207. In this regard, a cavity of the die 207 may be heated to an elevated temperature (e.g., between 1652° F. [900° C.] and 2,282° F. [1,250° C.]) prior to and during the die pressing step.

Pressed powder blend 306 is loaded into sintering furnace 308 which applies force to compact the pressed powder blend 306 and heat to sinter the pressed powder blend 306, thereby forming billet 212. In various embodiments, the pressed powder blend 306 may be loaded into sintering furnace after the die press process.

In various embodiments, sintering furnace 308 may be a vacuum sintering furnace and pressed powder blend 306 may be compressed and heated under a vacuum. In various embodiments, the compressed pressed powder blend 306 may be heated to between 900° F. [483° C.] and 1600° F. [871° C.] for the sintering operation. In this regard, the sintered billet may undergo beta phase transformation. Sintering the pressed powder blend 306 may include removing gasses evolved from the pressed powder blend 306 during sintering and sintering furnace 308 may include a gas removal system and/or control system. In various embodiments, oxygen, nitrogen, and/or hydrogen may be removed from the pressed powder blend 306 during sintering. In various embodiments, billet 212 may undergo an annealing cycle after sintering. In various embodiments, the annealing cycle temperatures may be between 1200° F. [649° C.] and In various embodiments, in response to sintering the pressed powder blend 306, a billet 212 having a cross-sectional profile 214 (e.g., a non-circular cross-sectional profile) may be formed. The cross-sectional profile 214 may correspond directly to a feedstock cross-sectional profile for an additive manufacturing machine.

In various embodiments, the cross-sectional profile 214 may be substantially square. "Substantially square" as described herein refers to a cross-sectional shape with four right angles plus or minus 5 degrees. Additionally, "substantially square" as referred to herein includes rounded corners, chamfered corners or any other type of corner. Although described herein as having a square cross-sectional shape, the present disclosure is not limited in this regard. For example, circular, rectangular, oval, or any other cross-sectional shape for feedstock is within the scope of this disclosure. In various embodiments, each side of the cross-sectional profile 214 may be between 0.05 inches (0.127 cm) and 0.5 inches (1.27 cm), or approximately 0.375 inches. Although described herein as substantially square, the present disclosure is not limited in this regard. For example, the cross-sectional profile 214 may comprise a substantially triangular shape, a substantially pentagonal shape, a substantially hexagonal shape, or the like. Any non-circular shape is within the scope of this disclosure.

The process described herein may be directly used in an additive manufacturing machine after a worked rod 230 is formed after sintering. In various embodiments, further conditioning (e.g., via a subtractive component 232, such as a die grinder, a mill, a bench grinder, a tool bit, a milling cutter, or the like) of the worked rod 230 may be performed if tight tolerances are desired. In this regard, conditioning may be optionally performed to further facilitate a feedstock cross-sectional profile 214 that is substantially complimentary to a feed aperture cross-sectional profile, in accordance with various embodiments.

Billet 212 may be sintered to any length with the cross-sectional profile 214. In various embodiments, the length may be a multiple of a uniform length for use as feedstock in a stir friction welding process as described further herein. In this regard, the billet 212 may be cut after being die pressed to a length between 3 feet (0.9 m) and 6 feet (1.8 m), or between 4 feet (1.2 m) and 5 feet (1.5 m). Billet 212 may be cut into a plurality of feedstock (or a plurality of the worked rod 230) for use with an additive manufacturing machine as described further herein.

In various embodiments, a density of the billet 212 may be less than a density if a known specification for a wrought metal alloy corresponding to a material composition of the powders 202 (e.g., Titanium alloy Ti-185 as described previously herein). For example, the density of the billet 212 may be between 90% and 100% of the density of the known specification, or between 95% and 100% of the known specification. In this regard, due to the strength of Titanium alloy Ti-185, a solid metal billet 212 having a density of less than 100% may exceed a desired strength for an additive manufacturing process a described further herein.

In various embodiments, the plurality of rod feedstock 234 may be fed into an additive manufacturing machine 242. With brief reference to FIG. 3, the additive manufacturing machine 242 is illustrated, in accordance with various embodiments. In various embodiments, the additive manufacturing machine 242 comprises a rotating tool 322 comprising an aperture 324 disposed therethrough. The aperture 324 comprises a cross-sectional profile 325 complimentary to the cross-sectional profile 214 from FIG. 2A. In this regard, the cross-sectional profile 214 from FIG. 2A corresponds to the cross-sectional profile 325 of the rotating tool 322 of the additive manufacturing machine 242 to receive the rod feedstock 234 during a stir friction welding process, in accordance with various embodiments. In this regard, the rod feedstock 234 is fed through the aperture 324 of the additive manufacturing machine to facilitate adding additional material to a respective previously laid layer or the like.

In various embodiments, the process disclosed herein may tend to eliminate utilization of induction coils for hot rolling, drawing, and/or coiling feedstock bar or wire. In various embodiments, conditioning may also be eliminated as sintering may be performed under a vacuum, preventing mill defects. In various embodiments, the process described herein may eliminate thermomechanical work of a billet prior to input into an additive manufacturing system.

Figure 3:
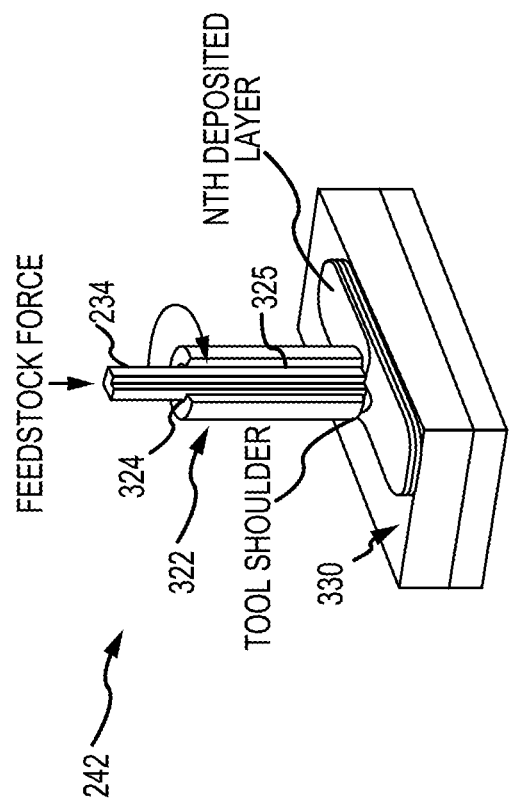
FIG. 3 illustrates an additive manufacturing machine for use in the method of FIGS. 2A and 2B.

Rod feedstock 234 may be loaded in the additive manufacturing machine 242 configured for rod feedstock 234. The additive manufacturing machine 242 may comprise hardware and/or software configured to perform additive manuring of an aerospace component. In various embodiments additive manufacturing may include friction stir welding additive manufacturing. In various embodiments, manufacturing machine 242 may be configured to deposit the rod feedstock 234 on a substrate (e.g., substrate 330 as shown in FIG. 3). For example, the additive manufacturing machine 242 may be configured with the rotating tool 322 of FIG. 3. In various embodiments, the additive manufacturing machine 242 may incorporate a single or a multiple rod feed system and be capable of delivering the rod feedstock 234 at a rate of 0.5 in/min [1.27 cm/min] to 25 in/min [63.5 cm/min] and may have deposition rates between 1 and 20 lbs/hour [0.45 and 9 kg/hr]. The additive manufacturing machine 242 may further be configured to supply an axial force to the rod feedstock 234 to cause the rod feedstock 234 to translate through the rotating tool 322.

Additive manufacturing machine 242 may produce a metallic aerospace component 244 from rod feedstock 234. Metallic aerospace component 244 may undergo a component heat treat process 245. In this regard, crack formation and oxide formation for the metallic aerospace component 244 may be reduced. Heat treatment operations may include solutionizing heat treatment, aging, and/or annealing. In various embodiments, heat treatments may include a beta anneal and an alpha beta anneal. For example, annealing between 1550° F. [843° C.] and 1600° F. [871° C.] or annealing between 1200° F. [649° C.] and 1400° F. [760° C.]. In various embodiments, a solutionizing heat treatment may be between 1350° F. [732° C.] and 1450° F. [788° C.]. In various embodiments, an aging heat treatment may be between 800° F. [427° C.] and 1100° F. [593° C.] or may be adjusted to achieve a desired material property for metallic aerospace component manufacture. In various embodiments, the heat-treated metallic aerospace component may have between 0.001% and 0.015% by weight hydrogen and may have between 0.1% and 1.0% by weight oxygen.

Figure 2B:
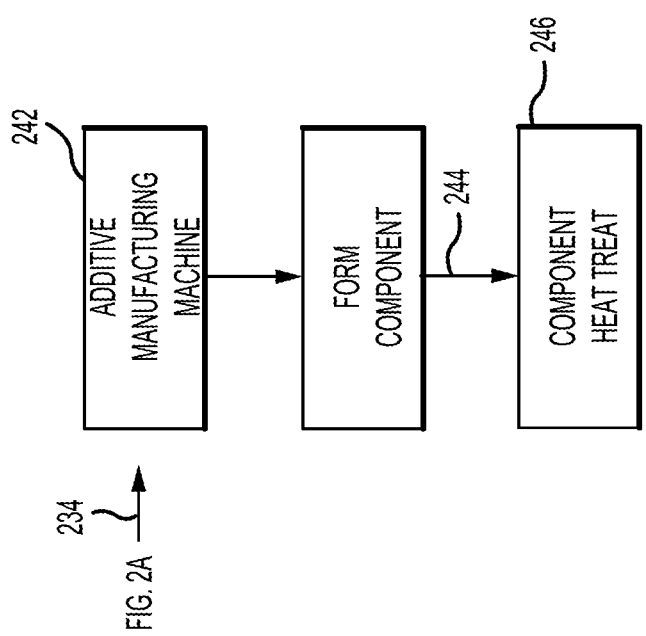
FIG. 2B illustrates a continuation of a method from FIG. 2A for titanium rod additive manufacturing, in accordance with various embodiments.
Figure 4:
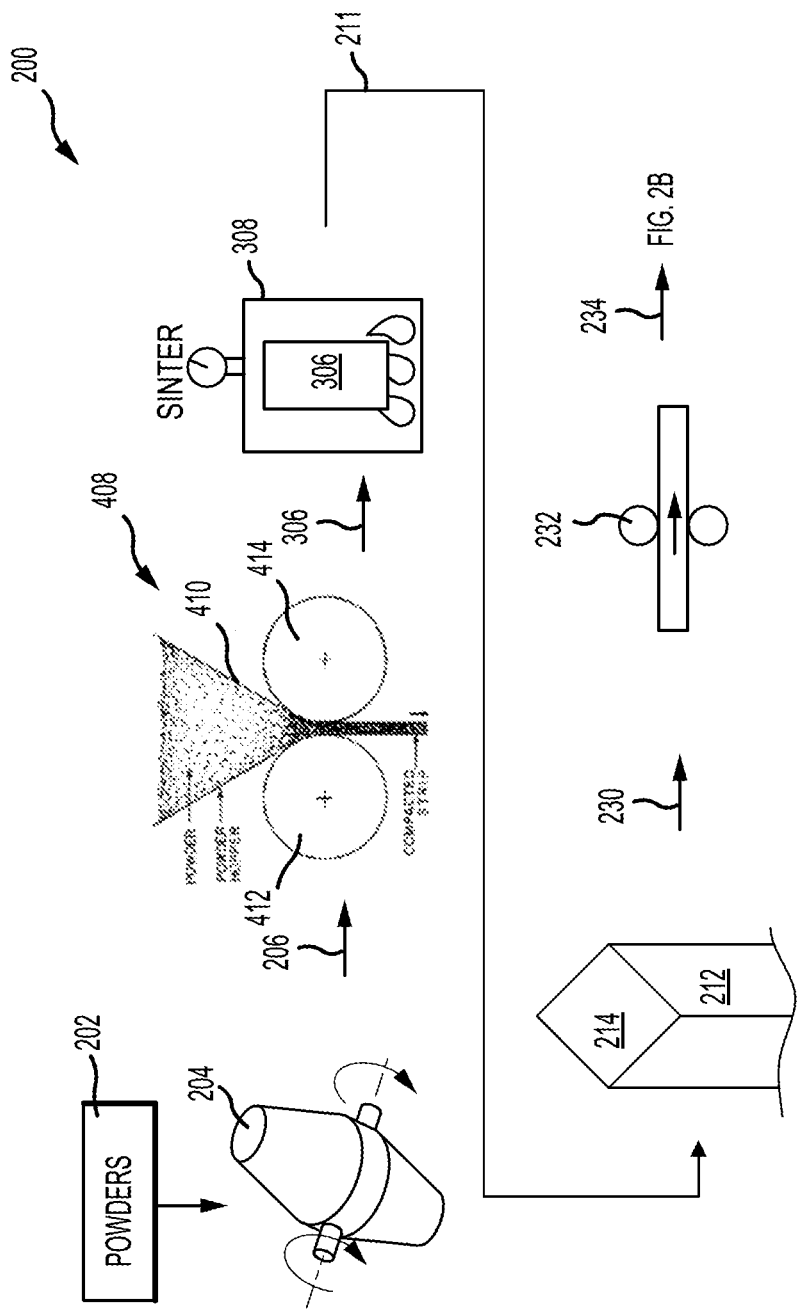
FIG. 4 illustrates a method for titanium rod additive manufacturing, in accordance with various embodiments.

Referring now to FIG. 4, method for titanium rod additive manufacturing is illustrated according to various embodiments. The method is in accordance with FIGS. 2A-B, with like numerals depicting like elements with the exceptions as described further herein. In various embodiments, the powder blend 206 may be fed through a powder roller system 408. The powder roller system 408 may comprise a hopper 410, a first roller 412 and a second roller 414. The powder roller system may further be configured to facilitate the cross-sectional shape 214 prior to being sintered. In various embodiments, the powder roller system 408 may facilitate the cross-sectional shape 214 roughly and the sintering furnace 308 may refine the cross-sectional shape 214.

In various embodiments, the continuous powder rolling system 408 and/or die press 208 may facilitate a solid rod feedstock directly for input in the stir friction welding/solid state diffusion process described above. In this regard, as rod feedstock is made directly into an input shape for the stir friction welding/solid state diffusion process, challenges faced from further processing (e.g., hot roller or drawing) may be eliminated.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of titanium rod additive manufacturing, comprising:
    mixing a plurality of powdered metals comprising titanium, iron, vanadium, and aluminum to produce a powder blend;
    die pressing the powder blend to form a die pressed powder blend;
    sintering the die pressed powder blend to form a rod feedstock having a cross-sectional profile, wherein the cross-sectional profile of the rod feedstock is a substantially square shape;
    loading the rod feedstock into an additive manufacturing machine configured to deposit the rod feedstock, wherein loading the rod feedstock further comprises applying an axial force to the rod feedstock to translate the rod feedstock through an aperture of a rotating tool; and
    producing, via stir friction welding, a metallic component from the rod feedstock.

2. The method of claim 1, wherein the titanium is a titanium hydride powder.

3. The method of claim 2, wherein the powder blend comprises between 4% and 6% by weight iron, between 0.5% to 2% by weight aluminum, and between 6% to 9% by weight vanadium.

4. The method of claim 3, wherein the sintering is performed between 900° F. (482° C.) and 1600° F. (871° C.) and under a vacuum.

5. The method of claim 1, wherein the die pressing is performed within a temperature range between 1652° F. (900° C.) and 2,282° F. (1,250° C.).

6. The method of claim 1, wherein the additive manufacturing machine comprises the rotating tool having the aperture disposed therethrough.

7. The method of claim 6, wherein the rod feedstock is fed through the aperture of the rotating tool.

8. The method of claim 1, wherein each side length of the rod feedstock is between 0.05 inches (0.127 cm) and 0.5 inches (1.27 cm).

9. A method of forming a rod feedstock for titanium stir friction welding additive manufacturing, comprising:
    mixing a plurality of powdered metals comprising titanium, iron, vanadium, and aluminum to produce a powder blend;
    at least one of die pressing the powder blend to form a die pressed powder or continuously powder rolling the powder blend to form the die pressed powder; and
    sintering the powder blend to form the rod feedstock having a cross-sectional profile, wherein the cross-sectional profile of the rod feedstock is a substantially square shape, wherein the cross-sectional profile of the rod feedstock corresponds to a second cross-sectional profile of a rotating tool of an additive manufacturing machine to receive the rod feedstock during a stir friction welding process.

10. The method of claim 9, wherein the titanium is a titanium hydride powder.

11. The method of claim 10, wherein the powder blend comprises between 4% and 6% by weight iron, between 0.5% to 2% by weight aluminum, and between 6% to 9% by weight vanadium.

12. The method of claim 9, wherein each side length of the rod feedstock is between 0.05 inches (0.127 cm) and 0.5 inches (1.27 cm).

* * * * *